United States Patent [19]

Long et al.

[11] Patent Number: 4,668,540

[45] Date of Patent: May 26, 1987

[54] BELTING AND METHOD OF MAKING SAME

[75] Inventors: Barry W. Long, Copley, Ohio; Peter J. Schmitt, Auburn, Me.

[73] Assignee: The Goodyear Tire & Rubber Company, Akron, Ohio

[21] Appl. No.: 565,443

[22] Filed: Dec. 27, 1983

Related U.S. Application Data

[63] Continuation of Ser. No. 344,108, Jan. 29, 1982, abandoned.

[51] Int. Cl.⁴ ............................................. B05D 3/12
[52] U.S. Cl. .................................. 427/369; 427/381; 427/389.9; 427/412
[58] Field of Search ................... 427/369, 389.9, 381, 427/412; 428/290, 284, 288, 286

[56] References Cited

U.S. PATENT DOCUMENTS

| 3,035,943 | 5/1962 | Nottebohm et al. | |
| 3,567,671 | 3/1971 | Janetos | 428/288 |
| 3,914,498 | 10/1975 | Videen | |
| 4,016,325 | 4/1977 | Flautt et al. | 428/288 |
| 4,125,663 | 11/1978 | Eckardt | 428/288 |
| 4,245,689 | 1/1981 | Grard | 428/288 |
| 4,293,612 | 10/1981 | Andersson et al. | 428/288 |
| 4,319,956 | 3/1982 | Snyder et al. | 428/288 |
| 4,414,267 | 11/1983 | Coran et al. | 428/488 |
| 4,417,931 | 11/1983 | Li | 428/288 |

Primary Examiner—Norman Morgenstern
Assistant Examiner—Janyce A. Bell
Attorney, Agent, or Firm—R. D. Thompson

[57] ABSTRACT

Belting consisting of a compacted non-woven felt fabric embedded in a matrix of elastomer. The belting may be made by saturating a greige non-woven fabric with a liquid, elastomer-forming, polymeric resin and thereafter compacting the saturated fabric to permanently reduce the thickness thereof. Following compaction of the saturated fabric, the liquid resin is solidified and cured. Curing is preferably accomplished at a temperature above ambient and at a pressure above atmospheric. The non-woven felt may be a spun-bonded, needle-punched, or stitch-bonded bat of fibers.

4 Claims, 2 Drawing Figures

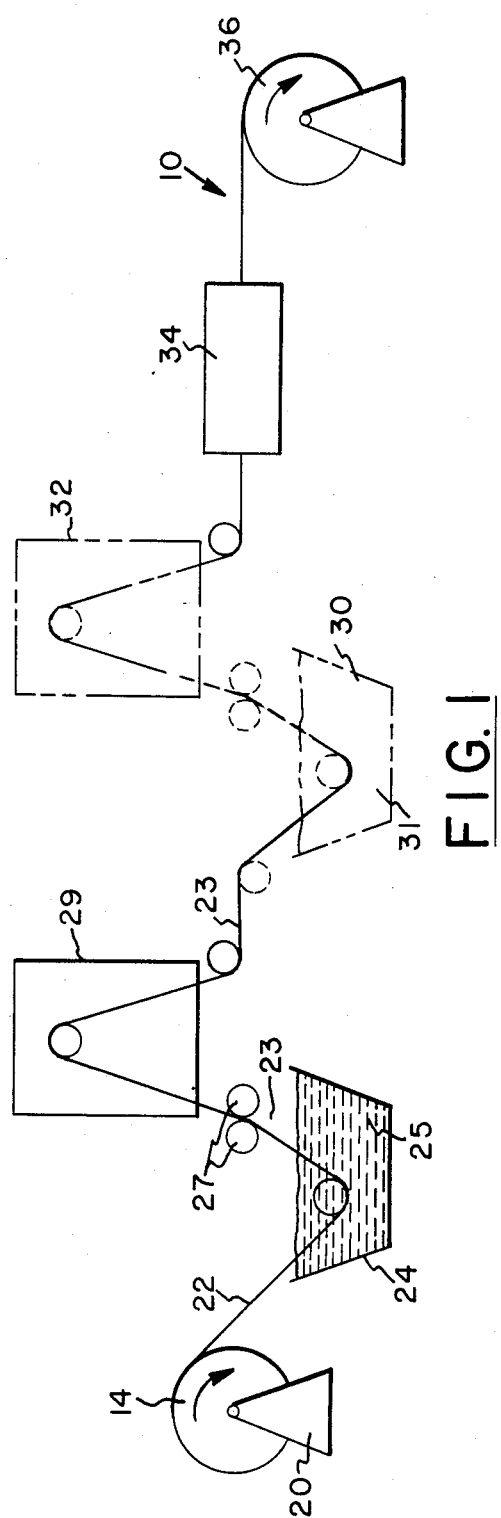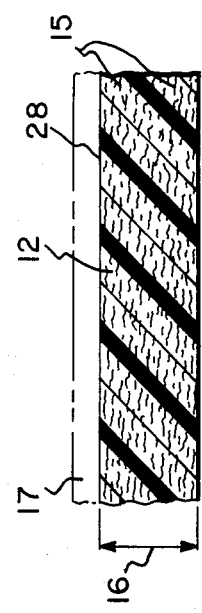

BELTING AND METHOD OF MAKING SAME

This is a continuation of application Ser. No. 344,108 filed on Jan. 29, 1982, now abandoned.

This invention relates to flat belting and more particularly, this invention relates to conveyor belting and to its manufacture.

The invention may be better understood by reference to the accompanying drawing in which like numerals are employed to indicate like items in the various views and in which:

FIG. 1 is a schematic side elevation illustrating a method for manufacture of belting according to the invention; and FIG. 2 is a side elevation in section of a fragment of a belting according to the invention.

The invention will be described with regard to the manufacture and construction details of a conveyor belting that is formed of one or more layers of non-woven fabric encapsulated in an elastomeric matrix such as fused polyvinylchloride. It is to be understood, however, that the invention is not intended to be limited to this example.

Referring to FIG. 1, there is illustrated a method for the manufacture of flat belting 10. Letoff 20 is provided with a roll 14 of greige non-woven felt fabric 22. Fabric 22 is a non-woven felt fabric. The greige fabric 22 is directed from letoff 20 into a saturator tank 24. Saturator tank 24 is filled with a liquid polymeric resin 25. The non-woven fabric 22 is at this time of greater thickness and less density than it will have in the completed belting 10. the longitudinally applied tension in the fabric 22 at this point is quite low and need only be sufficient to draw the fabric from the letoff 20 through the saturator tank 24. The relatively low density of greige fabric 22 and low tension applied to the fabric 22 at this time facilitate complete saturation of the fabric 22 with liquid polymeric resin 25.

After the fabric 22 has been wetted with a liquid polymeric resin 25, it is compacted and reduced in its thickness by application of pressure, for example, by passing the saturated fabric 23 through a pair of opposed rollers 27 which are located at or near the exit of the saturator tank 24. This operation also serves to remove any excess of liquid polymeric resin 25. The excess resin is returned to saturator tank 24. Compaction of the saturated fabric 23 increases its ability to withstand tension that is applied in the lengthwise direction of the fabric. Preferably, the saturated fabric 23 is reduced in thickness about twenty percent $$\% \text{ reduction in thickness} = \frac{\text{original thickness} - \text{compacted thickness}}{\text{original thickness}} \times 100)$$ by rollers 27.

The saturated fabric may be compressed to reduce its thickness by more than twenty percent. It is believed that up to fifty percent (50 percent) reduction in fabric thickness may be practical for the complete manufacturing process.

Upon exit from the compacting rollers 27, the saturated fabric 23 is passed through oven 29 to solidify the liquid resin saturant. The solidified resin saturant on fabric 22 is now cured into an elastomeric material 12 at a temperature above ambient and a pressure above atmospheric to fully develop its physical properties and to further compact and consolidate the fibers 15 of the non-woven felt fabric 22 in the elastomeric matrix 12. This completes the manufacturing cycle for belting 10. Thereafter the belting 10 is taken up on wind-up 36.

Optionally, as shown in phantom in FIG. 1, the resin-saturated fabric 23 after solidification of the liquid resin saturant may have a layer of cover-forming resin 30 applied, for example, by a second immersion operation in a second dip tank 31. Alternatively, the cover-forming resin 31 could be applied by means of a doctor blade (not shown) which spreads the cover-forming layer over a surface of the belting. Following application of the cover-forming resin 31, the cover layer 17 is solidified in optional oven 32 prior to curing of the belting in press 34. Thereafter the belting is taken up on the wind-up 36.

The belting 10 resulting from the process illustrated in FIG. 1 is shown in FIG. 2. Belting 10 comprises a compacted non-woven felt fabric 28, the fibers 15 of which are embedded in an elastomeric matrix 12. The thickness 16 of the belting 10 and the compacted fabric 28 closely correspond to one another in the absence of optional cover layer 17, which is shown in phantom.

It is to be understood that due to limitations of the illustration, only a minor number of the fibers 15 of the non-woven fabric are illustrated. The number and density of the fibers 15 is much greater in reality.

The non-woven felt fabric may be a bat or mat of staple and/or continuous fibers which are entangled with one another by a needle-punching operation or are spun-bonded to one another with an adhesive. Both of these methods of forming a non-woven fabric are considered conventional and will not be discussed further here. Another type of non-woven felt fabric which is within contemplation of the present invention is that including a bat or mat of staple and/or continuous fibers which are entangled to one another and are further reinforced by a stitching operation in which a thread is inserted. This type of fabric is also considered conventional and will not be further discussed here.

While the invention has been described with respect to a conveyor belt whose fabric layer is saturated with polyvinylchloride plastisol which is thereafter fused, it is to be understood that a wide range of liquid, polymeric, elastomer-forming resins may be employed. Representative are liquid precursors for neoprene, polystyrene, polybutadiene, polyurethane, carboxylated acrylonitrile/butadiene copolymers, and the like. The liquid polymeric resins may be pure and undiluted or diluted with a carrier, such as water or a solvent. In the context of this application, polyvinylchloride plastisol is considered to be an elastomer-forming, polymeric resin and so are the other enumerated liquid precursors.

The term "solidified" as used herein with reference to the liquid, elastomer-forming, polymeric resin means conversion of the liquid resin from its liquid state to a state in which it no longer runs along or drips from the non-woven fabric. Solidification as used herein includes drying as, for example, is required in the case of water-based latices or solvent-based polymeric resin solutions and gelling as applied, for example, to resin plastisols. When the liquid saturant is a polyvinylchloride plastisol, the resin may be gelled by application of heat. The term "gelling" as used here means that the polyvinylchloride plastisol becomes sufficiently solid that it will not thereafter flow at room temperature but does not have fully developed physical properties. Gelling of polyvinylchloride plastisol may be accomplished by heating the liquid plastisol to a temperature of at least 200°-220° F. In the instance in which a liquid resin including a carrier or solvent is employed, the carrier or solvent is evaporated. Undiluted liquid polymer resins which contain no carriers or solvents may be used and in this case partial curing or vulcanization is to be effected at this point in the process to solidify these liquid resins.

The term "curing" as used herein with reference to the liquid, elastomer-forming polymeric resin means treatment of the resin to conditions which will result in full development of its respective physical properties.

In the case where the liquid polymeric resin is a polyvinylchloride plastisol, the resin is cured by completely fusing the polyvinylchloride plastisol, for example, at temperatures in the range of 320° to 350° F. In the instance where latices or liquid rubbers or other polymer systems are employed, the polymer is cured or vulcanized or caused to cross-link or further polymerize and thereby develop fully its respective physical properties. Curing of the resin saturant is preferably conducted in a press of rotary or flat platen type. Of these, the flat platen type press is preferred due to its greater capacity to apply pressure to the belting.

It is preferred to apply sufficient pressure during curing of the belting to further compact and consolidate the non-woven fabric. Preferably, fabric that is saturated with solidified resin is reduced in thickness an additional five percent (5%) during curing. Thus, in a preferred embodiment, the fabric thickness in the finished belting is twenty-five percent (25%) less than that of the greige fabric. The fabric thickness in the finished belting may be up to fifty percent (50%) less than that of the greige fabric.

The following example describes the manner and process of making and using the invention and sets forth the best mode contemplated by the inventors of carrying out the invention but is not to be construed as limiting the invention.

EXAMPLE 1

A needle-punched polyester, non-woven felt fabric is saturated with polyvinylchloride plastisol by immersion therein. The greige fabric has a weight of 12 ounces per square yard and a thickness of 90 mils. Upon exit of the saturator tank, the thickness of the saturated fabric is reduced to about 72 mils. After gelling, the fabric containing the solidified polyvinylchloride resin is cured in a flat platen press at 320° for 12 minutes at 250 psig. The resulting belting has a finished thickness of 68 mils and a finished weight of 36 ounces per square yard. The finished belting is approximately 65 percent polyvinylchloride plastisol and 35 percent fiber by weight.

A comparison of the capability to resist a tensile force applied in the plane of the fabric in its lengthwise direction and that of the belting is made on an Instron testing machine (ASTM Procedure No. D-1682).

| LOAD AT RUPTURE | | |
| --- | --- | --- |
| | Lbs. Force per Inch Width | % Elongation at Rupture |
| Greige non-woven felt fabric | 70 | 120 |
| Non-woven felt/polyvinylchloride matrix conveyor belting according to Example 1 | 242 | 90 |

While the invention has been described by way of example for the manufacture and construction of a conveyor belting including a single layer of non-woven felt fabric embedded in an elastomeric matrix of polyvinylchloride resin, it is to be understood that belting comprising more than one layer of non-woven felt fabric each layer of which is saturated with a liquid elastomer-forming, polymeric resin is within comtemplation of this invention. In the manufacture of such a multi-layer belting, each of the non-woven felt fabric layers is to be saturated with the liquid polymeric resin. Thereafter, the layers are brought together and pass through pressing means such as a pair of opposed rollers at the exit of the saturated tank. The remainder of the process is as described hereinbefore with regard to single ply belting.

The use of liquid polymeric resins which are polymerized by photochemical reaction into an elastomeric matrix is also within contemplation of the invention.

While certain representative embodiments and details have been shown for the purpose of illustrating the invention, it will be apparent to those skilled in the art that various changes and modifications may be made therein without departing from the spirit or the scope of the invention.

What is claimed is:
1. A method of manufacturing solid, high tensile strength belting comprising the following steps:
 (a) providing a greige non-woven felt fabric,
 (b) saturating the greige fabric with an amount of liquid, elastomer-forming, polymeric resin that is greater by weight than the weight of greige fabric,
 (c) compressing the saturated fabric to permanently reduce its thickness by about 20 percent to about 50 percent and to remove excess liquid resin,
 (d) soldifying the liquid resin saturating the greige fabric to form a solidified, resin saturated fabric,
 (e) applying a cover-forming layer of a liquid; elastomer forming, polymeric resin,
 (f) curing the solidified, resin-saturated fabric at an elevated temperature and pressure to form finished belting having longitudinal tensile strength exceeding the longitudinal tensile strength of the greige non-woven felt fabric.
2. The method of claim 1, wherein the fabric thickness in the finished belting is from about 75 percent to about 50 percent of that of the greige fabric.
3. The method of claim 1, wherein the fabric is further permanently reduced in thickness during curing of the solidified resin.
4. The method of claim 1, wherein the fabric is a non-woven bat of synthetic fibers.

* * * * *